United States Patent [19]

Davanture

[11] Patent Number: 4,541,597
[45] Date of Patent: Sep. 17, 1985

[54] ADJUSTABLE SELF-SUPPORT STAND

[76] Inventor: Robert Davanture, 7, rue Clos Savaron, 69004 Lyon, France

[21] Appl. No.: 276,345
[22] PCT Filed: Oct. 21, 1980
[86] PCT No.: PCT/FR80/00152
  § 371 Date: Jun. 10, 1981
  § 102(e) Date: Jun. 10, 1981
[87] PCT Pub. No.: WO81/01321
  PCT Pub. Date: May 14, 1981

[30] Foreign Application Priority Data

Oct. 31, 1979 [FR] France ............................. 79 27514

[51] Int. Cl.⁴ ........................................... F16M 11/38
[52] U.S. Cl. ...................................... 248/167; 248/172
[58] Field of Search .................. 248/150, 163 A, 167, 248/172, 173, 188.6, 528; 135/107; 403/64, 92, 96, 170, 173

[56] References Cited

U.S. PATENT DOCUMENTS

| 574,424 | 1/1897 | Hoffman | 248/150 |
|---|---|---|---|
| 587,896 | 8/1897 | White | 248/167 |
| 1,068,679 | 7/1913 | Lortz | 403/96 |
| 1,338,486 | 4/1920 | Burdick | 248/150 |
| 1,777,759 | 10/1930 | Melvin | 248/173 |
| 2,212,455 | 8/1940 | Reed | 403/64 |

FOREIGN PATENT DOCUMENTS

| 539570 | 11/1931 | Fed. Rep. of Germany | 248/167 |
|---|---|---|---|
| 1087568 | 8/1960 | Fed. Rep. of Germany . | |
| 2161495 | 7/1973 | France . | |
| 2319838 | 2/1977 | France . | |
| 337539 | 3/1936 | Italy | 403/173 |
| 523007 | 7/1940 | United Kingdom | 248/163 A |

Primary Examiner—William H. Schultz
Attorney, Agent, or Firm—Sandler & Greenblum

[57] ABSTRACT

An adjustable, self-supporting stand adapted to provide for instantaneous adjustment of its ground-support polygon as a function of the dimensions of the apparatus to be supported, for example, a television, a piece of furniture, or a machine. This adjustable stand has four legs, each angled substantially in a right angle, and an assembly device which connects in diametrically opposed pairs the horizontal arm portions of the legs. The assembly device provides for a first angular adjustment with respect to a vertical axis and a second adjustment of the spacing between diametrically opposed legs by sliding the horizontal arm portions within sleeves integral to the assembly device. The assembly device is the only necessary part for connecting the legs and allows for the legs to be adjusted in accordance with an optimum, maximum spacing distance.

12 Claims, 7 Drawing Figures

ADJUSTABLE SELF-SUPPORT STAND

FIELD OF THE INVENTION

The invention relates to adjustable self-support stands which may be utilized to support diverse apparatus, for example in offices, laboratories, shops or apartments.

BACKGROUND OF THE INVENTION

It is know to provide stands having legs in which adjustment is achieved exclusively by platforms which are adapted to receive the legs of the apparatus to be supported, or by the spacing of the stand but at the expense of the positioning, between the legs, of a frame adapted to the dimensions of the apparatus to be supported. These supports are maladapted, expensive to manufacture and of limited use.

The present invention has as an aim to overcome these inconveniences.

SUMMARY OF THE INVENTION

The invention as defined in the claims, resolves the above-described problems by providing a stand adapted to allow for the instantaneous adjustment of the ground support polygon as a function of the dimensions of the apparatus to be supported. To this end, the adjustable stand comprises four legs angled substantially in a right angle so that each leg comprises a substantially vertical upright portion and a substantially horizontal arm portion and and also comprises an assembly means or apparatus connecting in pairs, the substantially horizontal arms of diametrically opposed legs and providing a first angular adjustment around a vertical axis and a second adjustment of the spacing of the legs, i.e., between the legs comprising a diametrically opposed pair. This self-supporting assembly device is the only necessary means of connection between the legs.

This stand offers the advantage of resisting all flexional and/or torsional stresses to which it can be subjected, particularly during displacement while the stand is loaded and the legs have wheels. This stand also assures the maximum amplitude of the adjustment of the spacing of the legs.

BRIEF DESCRIPTION OF THE FIGURES

In the following, the invention is described in greater detail with the help of drawings showing only one embodiment.

DETAILED DESCRIPTION OF THE INVENTION

Figure 1:
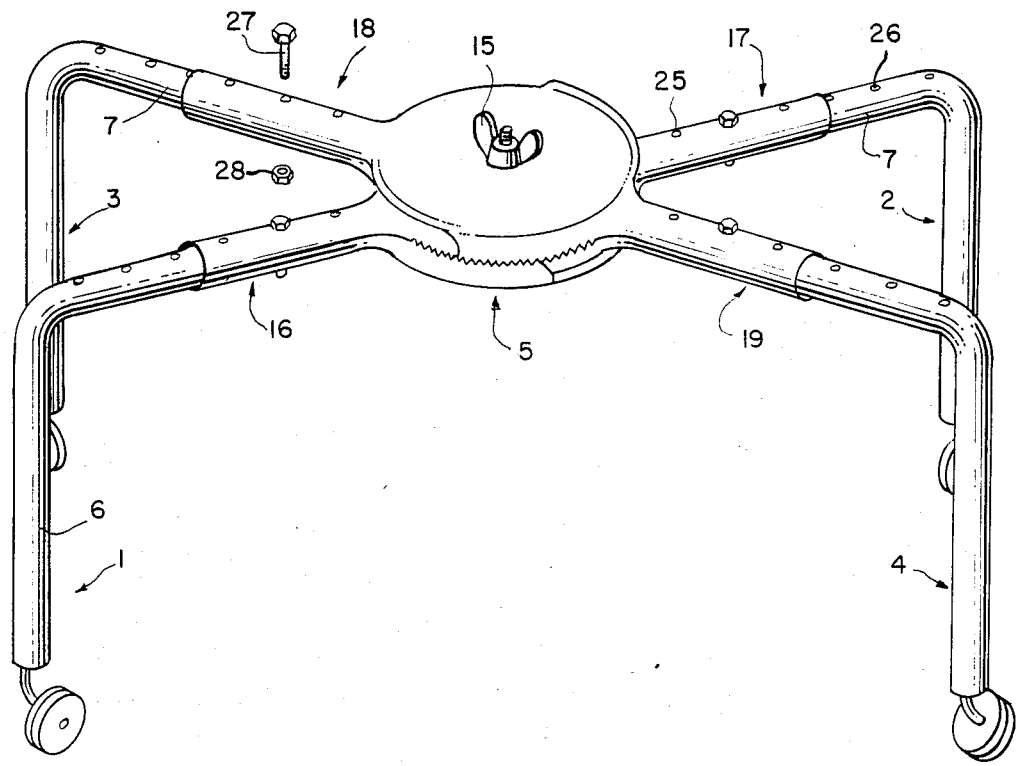
FIG. 1 is a composite view in perspective of a stand according to the invention.

FIG. 1 illustrates a stand according to the present invention, this stand comprising on the one hand four angled legs 1–4 and on the other hand an assembly means or device 5.

The angled legs, which are shown as and preferably are tubular, each comprise an upright portion 6 and a substantially horizontal arm portion 7.

Horizontal arms 7 of the legs are connected 2 by 2 end to end in the assembly means or apparatus 5, which is composed principally of four shells 8, 9, 10 and 11 each shell member comprising a substantially horizontal central plate 12, and two sleeve halves which are substantially coaxial, or substantially diametrically opposed, as well as a bolt or other tightening means 13 for extending through the four plates 12, of the shell members 8–11 along their center. These plates are squeezed or tightly secured between head 14 of bolt or other tightening and securing member 13 and a nut 15 screwed on the shaft of bolt 13.

The successive shells are to be assembled in stacked relationship to one another, as shown in the figures and are described below, with reference to FIGS. 2–5. Bottom shell member 8 is described first, with members 9–11 being described successively thereafter.

The first shell 8 has a concave surface which is turned upwardly and is associated with the leg couple 1-2. Shell member 8 carries lower half-sleeve 16a for receiving leg 1, and also carries lower half-sleeve 17a for receiving leg 2. Central plate 12 of shell 8 is provided with a substantially cylindrical peripheral skirt 20 emptied which after assembly faces or is generally pointed toward sleeves 18 and 19 for receiving the leg couple 3-4. Serration 21 is provided on the upper free edge of skirt 20.

Second shell 9 has a concave surface which is equally turned upwardly, i.e., in an amount substantially commensurate with the upward projection of the concave surface of shell member 8, and is associated with leg couple 3-4. Shell member 9 thus carries the lower half-sleeves 18a and 19a. The central plate of shell 9 is provided with a cylindrical skirt 22 emptied with respect to the sleeves 16 and 17, and is adjacent to the central disk or plate of shell 8.

Third shell 10 carries the upper half-sleeves 16b and 17b, and has a concave surface which is turned downwardly, is absolutely identical to the second shell 9 except this concave surface and skirt 22 are facing downwardly after assembly, whereas those of shell member 9 face upwardly.

Fourth shell 11 carries the upper half-sleeves 18b and 19b, and has a concave surface which is turned downwardly, is absolutely identical to the first shell 8, except this concave surface and skirt 22 face downwardly after assembly, whereas those of shell 8 face upwardly.

Figure 2:
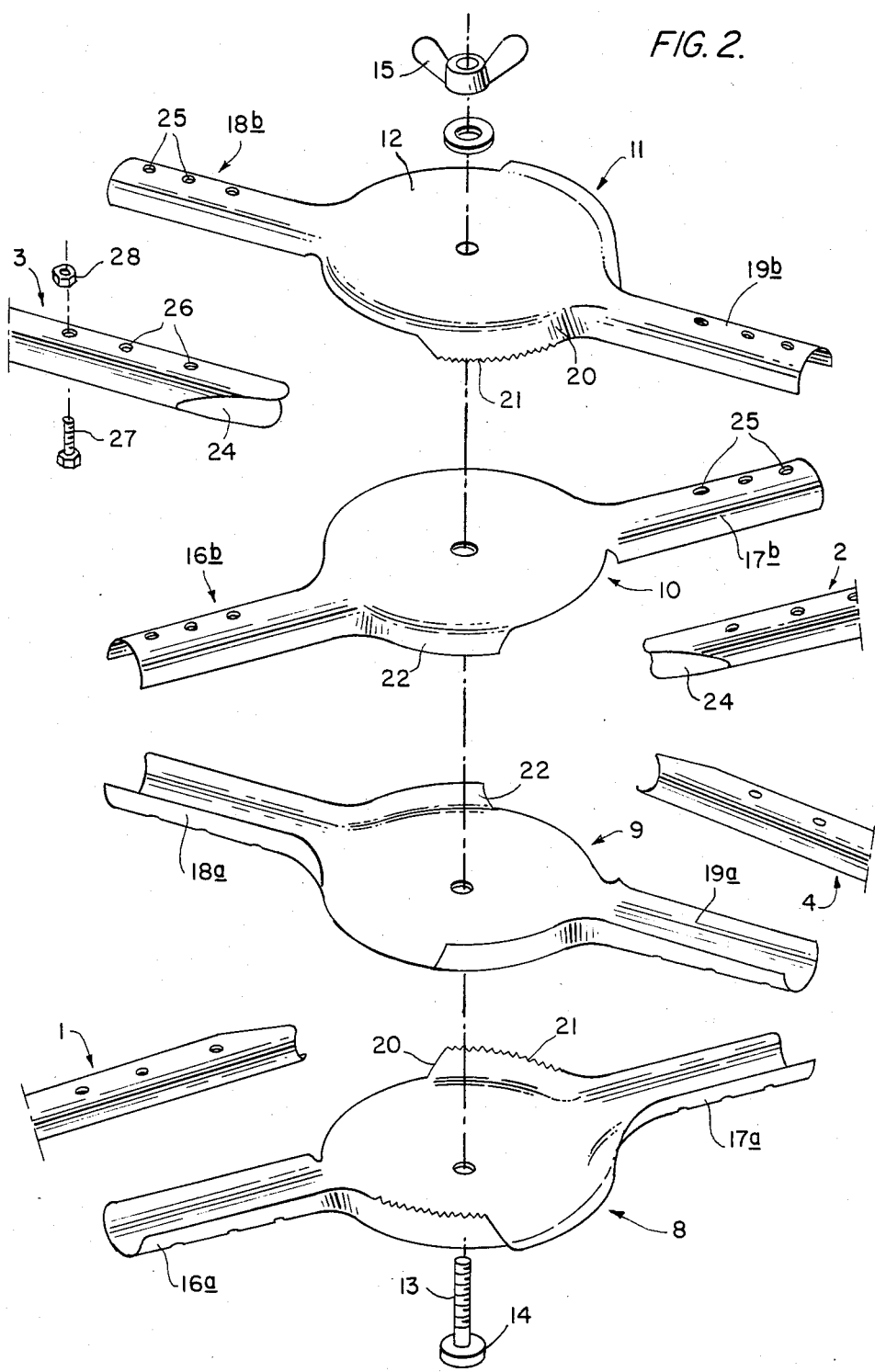
FIG. 2 is an exploded view of the stand illustrated in FIG. 1.

A central cavity 23 is defined between the respective central plates of shells 9 and 10 and is adapted to permit arms 7 of the legs to advance until they abut the shaft of bolt 13. Arms 7 of legs 1-4 preferably have their free end cut in a vertical bevel 24, as best shown in FIG. 2.

Legs 1-4 are attached on the assembly means or apparatus 5 by means of a latching system which comprises the following for each leg. A series of vertical holes 25 are bored diametrically in the corresponding sleeve; as shown in FIG. 2, a plurality of holes 25 are provided in each sleeve. A series of vertical holes 26 are bored diametrically in the horizontal arm of the corresponding leg. A bolt 27 whose shaft can be threaded simultaneously in one of the holes 25 of the sleeve and in one of the holes 26 of the leg, and which has a head and a screw 28 between which the leg and the sleeve can be simultaneously tightened together.

The present invention operates as follows.

To adapt the stand to a given apparatus, two adjustments are available. In one, an angular adjustment is provided by relative pivoting of the two pairs of legs 1-2 and 3-4 around the vertical pivot provided by bolt 13. Once this adjustment has been performed, screw 15 is blocked on the shaft of the bolt 13 in a manner to obtain latching by mutual engagement of serrations 21 of shells 8 and 11. In the other, a lengthwise adjustment is provided by sliding of the horizontal arms 7 of the legs in the sleeves. Once this adjustment has been carried out, bolts 27 are put in place and screws 28 are tightened, as shown in FIG. 1.

The apparatus as described above has the following particular advantages. The adjustable stand apparatus of the present invention needs neither frame nor accessories because its central assembly means or apparatus 5 is sufficiently rigid to provide the only needed means of connection between the legs, while assuring adequate resistance to flexion and to torsion of the assembly. Further, the apparatus can be adjusted very rapidly and very simply as a function of different sizes of equipment to be supported. Also, the cost of manufacture is considerably reduced because identical parts are used for shells 8 and 11 as well as for shells 9 and 10.

Figure 6:
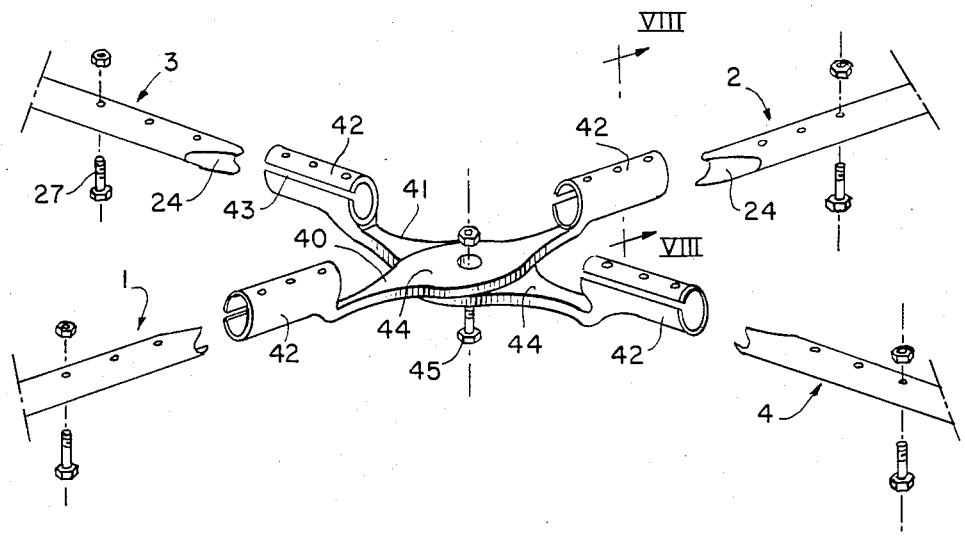
FIG. 6 is an exploded view of a stand according to one embodiment.
Figure 7:
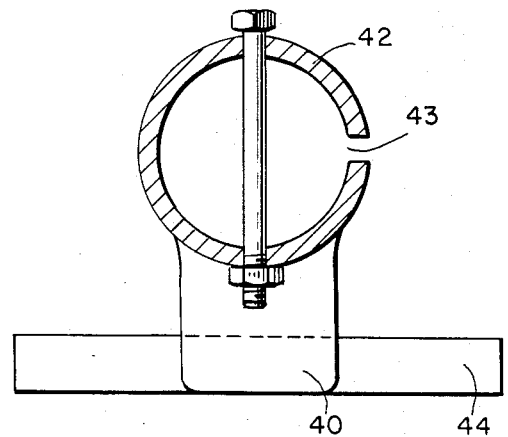
FIG. 7 is a cross-sectional view along axis VIII—VIII of FIG. 6.

According to an alternative illustrated in FIGS. 6 and 7, the assembly means or apparatus 5 comprises two arms 40 and 41 respectively associated with leg pairs 1-2 and 3-4, each arm 40 and 41 comprising the following. At the ends, two monobloc sleeves 42 associated with one of the leg pairs 1-2 or 3-4 and each sleeve 42 is provided, atmidheight, with a longitudinal slit 43. Between sleeves 42 an elongated plate 44 is situated beneath the level of sleeves 42.

Figure 3:
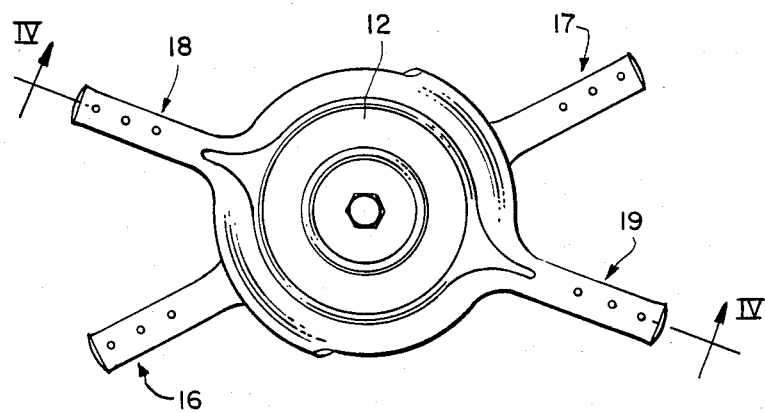
FIG. 3 is a top view of the central assembly device according to the present invention.
Figure 4:
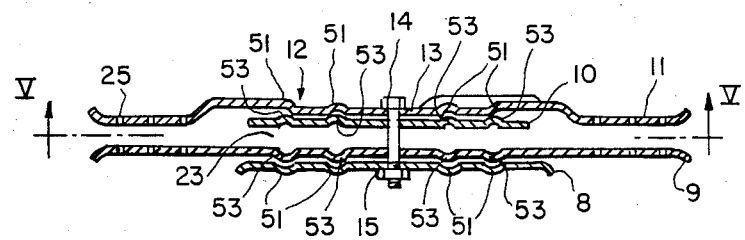
FIG. 4 is a cross-sectional view along axis IV—IV of FIG. 3.
Figure 5:
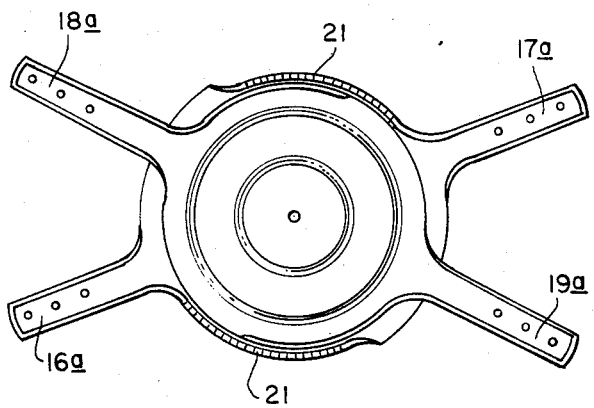
FIG. 5 is a planar view along axis V—V of FIG. 4.

Arms 40 and 41 are journalled with respect to one another by means of a vertical pivot axis formed by a bolt 45 whose shaft simultaneously passes through the two bodies 44 at their middle. The contact surfaces of plates 44 are provided with radial grooves which form serrations for angular adjustment of arms 40 and 41. Such radially serrated surfaces are best illustrated in FIGS. 3-5 in connection with the embodiment of FIGS. 1-5, and it should be understood that FIGS. 3-5 also illustrate the radial grooves forming serrations as described above for the alternative embodiment of FIGS. 6-7. Further, as shown in FIG. 4, plates 8 and 11 include radial grooves 51 for engagement with radial projections 53 in members 9 and 10 respectively.

As previously described with respect to FIGS. 1-5, each leg 1-4 is provided with latching means or system whose matching or connecting part is a vertical bolt 27 threaded diametrically through the substantially horizontal arm portion of the leg and through the corresponding sleeve 42.

This embodiment allows ultimately for oversizing of the components, and, as a result, is appropriate for supporting more substantial loads.

The adjustable stand according to the present invention finds use in many fields or areas, and particularly for the following: (1) For domestic uses, for example to support a television; (2) In audiovisual applications, to support different apparatus for sound and visual reproduction; (3) In the laboratory, to support various apparatus utilized; (4) In the shop; to support various tools; and (5) For all other professional uses.

In all such cases as described above the legs can be adjusted such that the support polygon corresponds to the size of the apparatus and is not easily movable, thus providing for both stability and aesthetics.

From the foregoing description, one skilled in the art can easily ascertain the essential characteristics of this invention, and without departing from the spirit and scope thereof, can make various changes and modifications of the invention to adapt it to various usages and conditions. Thus, that modifications can be made to the apparatus which has just been described, particularly by substitution of equivalent technical means without going beyond the scope of the present invention.

I claim:

1. An adjustable support stand comprising:
   (a) four legs, each of said legs being formed in a generally L-shaped right angle configuration which includes a substantially horizontal arm portion and a substantially vertical, upright portion; and
   (b) assembly means for connecting said substantially horizontal arm portions of said legs in diametrically opposed pairs, said assembly means comprising four shell members journaled about a tightening member, each of said shell members comprising two-half sleeves and a hollowed cylindrical skirt, each of said members further comprising means for retaining one of said horizontal arm portions, said assembly means further comprising first adjustment means for angularly adjusting said legs about a vertical axis and second adjustment means for adjusting the distance between legs comprising each diametrically opposed pair, said legs together defining a polygonal support surface for an article which can be adjusted as a function of the dimensions of an object to be supported, each of said diametrically opposed pairs of legs adapted to be adjusted over a maximum amplitude between one position in which said pairs are arranged perpendicularly and another position in which said pairs are arranged substantially parallel.

2. The apparatus as recited in claim 1, wherein said assembly means is the only means for connecting said legs.

3. The apparatus as recited in claim 1, wherein said second adjustment means includes means for sliding said legs diametrically with respect to said assembly means.

4. The apparatus as recited in claim 1, wherein two of said shell members are internal shell members, and two of said shell members are external shell members, said external shell members being coupled to a pair of diametrically opposed legs, and said internal shell members being coupled to the other pair of diametrically opposed legs.

5. The apparatus as recited in claim 1 wherein two of said shell members are internal shell members, and two of said shell members are external shell members, one external shell member and one internal shell member being coupled to a pair of diametrically opposed legs and the other external shell member and the other internal shell member being coupled to the other pair of diametrically opposed legs.

6. The apparatus as recited in claim 4, wherein said shell members are disposed in stacked relationship with one another and wherein the surfaces of said internal shell members which are in contact with the surfaces of said external shell members each comprise a radially serrated surface.

7. The apparatus as recited in claim 5, wherein said external shell members each include a skirt with a free edge having a serration in the shape of a wolf-tooth.

8. The apparatus as recited in claim 1, wherein each shell member includes a half-sleeve including a plurality of holes and each horizontal arm portion of each said leg includes a plurality of corresponding holes, such that each arm can be secured through said holes to a said half-sleeve at a selected spacing of said legs.

9. The apparatus as recited in claim 1, wherein said assembly means includes two journalled arms, each arm having a pair of diametrically opposed split sleeves connected by a side plate, each said pair of diametrically opposed split sleeves including means for coupling two said legs.

10. The apparatus as recited in claim 5 or 9, wherein said horizontal arm portions of said legs include ends having a beveled shape such that said ends can slide within a said sleeve to abut against a pivotable tightening means for tightening said shells in a stacked relationship.

11. The apparatus as recited in claim 10, wherein said pivotable tightening means comprises a bolt.

12. The apparatus as recited in claim 9, wherein the surfaces of said slide plates of said journalled arms which are in contact each include radial serrations.

* * * * *